United States Patent
Kono et al.

(10) Patent No.: US 7,460,599 B2
(45) Date of Patent: Dec. 2, 2008

(54) VIDEO DECODING DEVICE AND METHOD, AND PROGRAM PRODUCT THEREFOR

(75) Inventors: Tadayoshi Kono, Kawasaki (JP); Mitsuhiko Ohta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 131 days.

(21) Appl. No.: 10/105,215

(22) Filed: Mar. 26, 2002

(65) Prior Publication Data

US 2002/0196857 A1    Dec. 26, 2002

(30) Foreign Application Priority Data

Jun. 20, 2001    (JP)    ............................. 2001-185793

(51) Int. Cl.
*H04B 1/66* (2006.01)
(52) U.S. Cl. ................................. 375/240.25
(58) Field of Classification Search ..............................
375/240.01–240.29, 270.25; 348/700, 559; 345/670; 711/145; 386/68–71, 81–82, 111–112, 386/8–11; 358/310; *H04B 1/66*
See application file for complete search history.

(56) References Cited

U.S. PATENT DOCUMENTS

| | | | | |
|---|---|---|---|---|
| 5,243,422 A | * | 9/1993 | Owashi et al. | 348/459 |
| 5,451,982 A | * | 9/1995 | Stern et al. | 345/670 |
| 5,497,237 A | * | 3/1996 | Hosokawa et al. | 386/8 |
| 5,684,539 A | * | 11/1997 | Boyce et al. | 375/240.24 |
| 5,907,660 A | * | 5/1999 | Inoue et al. | 386/109 |
| 6,031,960 A | * | 2/2000 | Lane | 386/68 |
| 6,118,491 A | | 9/2000 | Wu et al. | |
| 6,356,702 B1 | * | 3/2002 | Suzuki | 386/68 |
| 6,487,642 B1 | * | 11/2002 | Duruoz et al. | 711/145 |
| 6,791,622 B2 | * | 9/2004 | Zeidler et al. | 348/559 |

FOREIGN PATENT DOCUMENTS

| | | |
|---|---|---|
| EP | 0944 249 A | 9/1999 |
| EP | 1 032 203 | 8/2000 |
| WO | WO 00/59219 | 10/2000 |

OTHER PUBLICATIONS

European Search Report dated Dec. 15, 2004 for corresponding application No. 02 25 2700.

* cited by examiner

*Primary Examiner*—Tung Vo
(74) *Attorney, Agent, or Firm*—Staas & Halsey LLP

(57) ABSTRACT

A video decoding device which enables smooth reverse playback of 3:2 pulldown video streams. A video data storage unit stores pictures constituting a video stream that is being played back, where each picture consists of a first field and a second field. An attribute data storage unit stores attribute data which describes how each picture should be displayed. The attribute data includes a repeat-first-field flag for each picture. When playing back the video stream in a reverse direction, a reverse playback unit determines whether the repeat-first-field flag is set or cleared, and reads out the first and second fields of each picture in the same order as that in forward playback mode if the repeat-first-field flag is set. If the repeat-first-field flag is cleared, it reads out the first and second fields in the opposite order to that in the forward playback mode.

3 Claims, 18 Drawing Sheets

| LAYER | PARAMETER | DESCRIPTION |
|---|---|---|
| SEQUENCE | horizontal_size_value | HORIZONTAL SIZE OF PICTURE |
| | vertical_size_value | VERTICAL SIZE OF PICTURE |
| | frame_rate_code | NTSC FORMAT OR PAL FORMAT |
| | display_horizontal_size | HORIZONTAL DISPLAY SIZE OF DECODED PICTURE |
| | display_vertical_size | VERTICAL DISPLAY SIZE OF DECODED PICTURE |
| GOP | closed_gop | POSSIBLE TO DISPLAY B-PICTURE AT TOP OF GOP |
| | broken_link | IMPOSSIBLE TO DISPLAY B-PICTURE AT TOP OF GOP |
| PICTURE | top_field_first | DISPLAY FROM FIRST FIELD |
| | repeat_first_field | REPEAT FROM FIRST FIELD |
| | frame_center_horizontal_offset | PARAMETER FOR PAN SCAN |
| | frame_center_vertical_offset | PARAMETER FOR PAN SCAN |

FIG. 4

| PARAMETER | B0 | B1 | I2 | P3 |
|---|---|---|---|---|
| horizontal_size_value | 704 | ← | ← | ← |
| vertical_size_value | 480 | ← | ← | ← |
| frame_rate_code | 0100 | ← | ← | ← |
| display_horizontal_size | 704 | ← | ← | ← |
| display_vertical_size | 480 | ← | | ← |
| closed_gop | 1 | 1 | NONE | NONE |
| broken_link | 0 | 0 | NONE | NONE |
| top_field_first | 1 | 1 | 0 | 0 |
| repeat_first_field | 0 | 1 | 0 | 1 |
| frame_center_horizontal_offset | NONE | ← | ← | ← |
| frame_center_vertical_offset | NONE | ← | ← | ← |

( ← : DITTO )

FIG. 6

| PARAMETER | B0 | B1 | I2 | P3 |
|---|---|---|---|---|
| horizontal_size_value | 704 | ↓ | ↓ | ↓ |
| vertical_size_value | 480 | ↓ | ↓ | ↓ |
| frame_rate_code | 0100 | ↓ | ↓ | ↓ |
| display_horizontal_size | 704 | ↓ | ↓ | ↓ |
| display_vertical_size | 480 | ↓ | ↓ | ↓ |
| closed_gop | 1 | 1 | NONE | NONE |
| broken_link | 0 | 0 | NONE | NONE |
| top_field_first | 1 | 1 | 1 | 1 |
| repeat_first_field | 0 | 0 | 0 | 0 |
| frame_center_horizontal_offset | NONE | ↓ | ↓ | ↓ |
| frame_center_vertical_offset | NONE | ↓ | ↓ | ↓ |

( ↓ : DITTO )

FIG. 7

VIDEO DECODING DEVICE AND METHOD, AND PROGRAM PRODUCT THEREFOR

BACKGROUND OF THE INVENTION

1. Field of the Invention

The present invention relates to a video decoding device, a video decoding method, and a program product therefor. More particularly, the present invention relates to a video decoding device which decodes a video stream containing MPEG-compressed picture frames each consisting of a first and second fields while inserting extra fields into the video stream in process a specified number of times. The present invention further relates to a video decoding method and a computer program which perform for the same.

2. Description of the Related Art

MPEG, short for Moving Picture Experts Group, is known as the name of international standard specifications for video compression systems. MPEG-based video coding and decoding systems play an essential role in our multimedia processing environments of today, and various types of MPEG coders and decoders have been developed.

FIG. 15 shows a typical configuration of a conventional MPEG video decoding device. As seen, this device comprises the following elements: a buffer memory 50, a video decoder 51, a decoding controller 52, a frame memory 53, and a display controller 54 and v-sync generator 55.

The buffer memory 50 serves as a temporary storage space for buffering an incoming bit stream. The video decoder 51 decodes video data stored in the buffer memory 50 in response to a decoding start command given from the decoding controller 52. Here, the video data includes: intra-coded pictures (I pictures), predictive-coded pictures (P pictures), and bidirectionally predictive-coded pictures (B pictures). The resulting decoded pictures are stored into the frame memory 53. The decoding controller 52 controls video decoding processes, including issuance of decoding start commands to the video decoder 51.

The frame memory 53 has the capacity of four pictures (or four frames), the space of which is segmented into four sections to store individual pictures reproduced by the video decoder 51. Those memory sections are referred to herein as the "banks."

The display controller 54 determines the direction of playback operation according to a playback direction flag which indicates whether it is forward playback or reverse playback. The display controller 54 also provides the frame memory 53 with display start commands in synchronization with a vertical synchronization (v-sync) signal. Further, the display controller 54 determines in what order to read pictures when displaying a video stream, consulting display parameters stored in the frame memory 53.

The operation of the conventional video decoding device of FIG. 15 will be explained below, assuming a short video bitstream containing four pictures I2, B0, B1, and P3. The explanation begins with forward playback operation, and then proceeds to reverse playback operation.

(1) Forward Playback

The buffer memory 50 stores and forwards an incoming bitstream to the video decoder 51. The decoding controller 52 issues a decoding start command, which causes the video decoder 51 to reproduce motion pictures by decoding the source bitstream supplied from the buffer memory 50 in accordance with the syntax of MPEG video specifications. The resultant decoded pictures are supplied to the frame memory 53 for display.

During the decoding process, various display parameters are also reproduced along with the motion pictures themselves and stored in their relevant parameter banks of the frame memory 53. Suppose, for example, that the picture I2 has been decoded and stored into the second bank (bank #2). Display parameters for the picture I2 are written into its associated parameter bank #2, which is shown on the right of the bank #2 in FIG. 15. In this way, four decoded pictures I2, B0, B1, and P3 are stored in the banks #2, #0, #1, and #3, respectively, and their corresponding parameters are stored in the associated parameter areas.

The pictures decoded in the above process will then be displayed as follows. As mentioned earlier, the display controller 54 operates in synchronization with the v-sync signal supplied from the v-sync generator 55. Upon detection of every falling edge of the v-sync signal, the display controller 54 reads display parameters out of one of the parameter banks relevant to the next picture to be displayed. In forward playback mode, the four pictures should be displayed in the order of B0, B1, I2, and P3, and accordingly, the display controller 54 begins a display process with fetching parameters for the first picture B0. Such parameters describe the intended display format of each picture in the video stream. The display controller 54 uses them to determine how the picture of interest should be presented on a television screen. Suppose here that the display parameters of picture B0 are:

display_horizontal_size_value=704
display_vertical_size_value=480
closed_gop=1
top_field_first=1

Those parameters tells the display controller 54 that the decoded picture B0 is 704×480 pixels in size and its top field (described later) has to be displayed first.

Having parsed the display parameters, the display controller 54 retrieves picture data from the frame memory 53 for display. In the present example, the display controller 54 reads the data of picture B0 out of the bank #0 and outputs it for display purposes, since the first picture is B0.

Here, each picture frame is interlaced into two fields called "top field" and "bottom field." The display controller 54 obtains one frame of 704×480 pixels by actually reading its top field first and then its bottom field.

Subsequent to the above processing for B0, the display controller 54 starts working at the next picture B1. As in the case of picture B0, it first reads relevant parameters out of the parameter bank #1, parses them, and retrieves the picture data of B1 from the bank #1 of the frame memory 53 for display. The display controller 54 processes and outputs the other pictures I2 and P3 just in the same way.

FIG. 16 is a timing diagram which explains the operation of the conventional video decoding device of FIG. 15. The topmost two rows (A) and (B) of FIG. 16 show a v-sync signal and a sequence of reproduced pictures. The sequence starts with the top field of picture B0 (B0$t$), which is followed by the bottom field of the same (B0$b$). Note here that the lower-case letters "t" and "b" are used to mean "top field" and "bottom field," respectively. Similarly, the fields of other pictures are read and displayed in the order of: B1$t$, B1$b$, I2$t$, I2$b$, P3$t$, and P3$b$.

(2) Reverse Playback

In reverse playback mode, the video decoding device outputs pictures backward. The decoding phase of this process, however, is the same as that in the forward playback mode described in (1). That is, the video decoder 51 decodes a given video bitstream and stores the resultant pictures into the frame memory 53.

The subsequent read operation is different from that in the forward playback mode. The display controller 54 makes read access to the frame memory 53 in the reverse order as will be described below.

To play back a video in the reverse direction, the display controller 54 has to be so notified. This is accomplished by setting the playback direction flag to "reverse." Recognizing the requested playback direction from this flag, the display controller 54 starts reading video data in synchronization with the falling edge of the v-sync signal. In the present example, the four pictures are read in the order of P3, I2, B1, and B0, which is the opposite to how they are read out in forward playback mode.

The display controller 54 uses display parameters also in reverse playback mode, interpreting the parameter "top_field_first" adaptively to the playback direction. More specifically, this parameter "top_field_first" specifies whether to read the top field first ("1") or the bottom field first ("0") in forward playback mode. When "top_field_first" is set to "1" in reverse playback mode, the display controller 54 interprets it in the opposite way, thus reading out the bottom field first and then the top field. For smooth playback, it is important for the video decoding device to reverse the reading order of fields that is defined on the assumption that video frames are played back in the forward direction.

Parts (C) and (D) of FIG. 16 show the v-sync signal and the sequence of pictures I2, B0, B1, and P3 which are produced in the reverse direction according to the above-described rules. As this diagram shows, the sequence starts with P3b, and it is followed by the fields of: P3t, I2b, I2t, B1b, B1t, B0b, and B0t. Note that this order is exactly opposite to that in the forward playback mode.

(3) Forward Playback of 3:2 Pulldown Video

When recording a movie, a motion picture camera captures images at 24 frames every second. Frame rate conversion is therefore required to play a 24-fps motion picture on 30-fps television systems. This is known as the "telecine conversion." A telecine converter inserts an extra frame every fourth frame to increase the frame rate to 30 fps. The resultant sequence of pictures is referred to as "3:2 pulldown video." The following will describe how a 3:2 pulldown video is played back in the forward direction.

FIG. 17 is a timing diagram which explains how the conventional video decoding device plays a 3:2 pulldown video, where the topmost two parts (A) and (B) show the result of forward playback. As seen from the illustrated sequence, the fifth field is a copy of the third field "B1t," and the tenth field is a copy of the eight field "P3t." In this way, some field images in the original motion picture are repeatedly used in the playback sequence just to increase the frame rate so as to adhere to the existing television standards.

Part (B) of FIG. 17 also demonstrates that the video decoding device maintains the normal field order of top, bottom, top, bottom, and so on, even if it has to insert extra fields to achieve the telecine conversion. In this way, the conventional video decoding device can smoothly play back 3:2 pulldown videos.

(4) Reverse Playback of 3:2 Pulldown Video

When playing a 3:2 pulldown video backward, the video decoding device reads and outputs the pictures P3, I2, B1, B0 in that order, as in the case of ordinary videos. When the aforementioned parameter "top_field_first" is set to "1" (i.e., read the top field first in forward playback mode), the conventional video decoding device interprets it reversely, thus outputting the bottom field first and then the top field.

The bottommost two parts (C) and (D) of FIG. 17 show the field sequence in the present example. As seen, the first field is P3t, and the second is P3b. The third field is a copy of "P3t." This is followed by I2t, I2b, B1b, and then B1t. The next field is a copy of B1b. Finally, the sequence ends with B0b and B0t.

Referring to FIG. 17, we have a forward-playback picture sequence (B) and a reverse-playback picture sequence (D) which are produced from the same set of 3:2 pulldown video and display parameters. It should be pointed out that the reverse-playback picture sequence (D) has some inconsistency in terms of the arrangement of neighboring fields.

In every output picture sequence, the system requires that top fields be sent out when the v-sync signal is low, while bottom fields be sent out when the v-sync signal is high. As for the reverse-playback picture sequence (D), however, a top field I2t comes in the fourth slot which is assigned to a bottom field. Likewise, the fifth slot is occupied by the bottom field I2b although that slot is for a top field. Similar violation occurs in the ninth and tenth slots, too.

As seen from the above, the conventional method fails to maintain the consistent timing relationships between bottom fields and top fields. This inability causes an artifact called "jaggies" illustrated in FIG. 18. The left part (A) of FIG. 18 shows an original picture encoded in a video stream. The conventional video decoding device, however, would reproduce it as shown in the right part (B) of FIG. 18 when playing the video stream backward. Viewers might perceive such jaggies as an irritating flicker of images.

The above-described problem of jaggies could be solved by employing a filter to correct the temporal alignment of top and bottom fields. It is difficult, however, to implement such a correction filter in hardware because it requires costly field memories to store picture data. Another problem is that a filter adds an extra delay time to the video stream. To compensate for that delay, the video decoding device has to prefetch a certain amount of data from the frame memory, which increases the complexity of video decoding tasks.

SUMMARY OF THE INVENTION

In view of the foregoing, it is an object of the present invention to provide a video decoding device with a reverse playback function which does not produce jaggies.

To accomplish the above object, according to the present invention, there is provided a video decoding device which decodes a video stream containing MPEG-compressed frames each consisting of a first and second fields while inserting extra fields into the video stream in process a specified number of times. This video decoding device comprises the following elements: a video data storage unit, an attribute data storage unit, and a reverse playback unit. The video data storage unit stores pictures constituting the video stream that is being played back. The attribute data storage unit stores attribute data describing how each picture should be displayed. Here, the attribute data includes a repeat-first-field flag for each picture. The reverse playback unit determines whether the repeat-first-field flag in the attribute data storage unit is set or cleared, when playing back the video stream in a reverse direction. It reads out the first and second fields of each picture in either of the following two ways: (a) in the same order as that in forward playback mode if the repeat-first-field flag is set, and (b) in the opposite order to that in the forward playback mode if the repeat-first-field flag is cleared.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 shows a set of parameters used in the present embodiment;

FIG. 6 shows an example of parameter settings in 3:2 pull-down video;

FIG. 7 shows an example of parameter settings in normal video;

DESCRIPTION OF THE PREFERRED EMBODIMENTS

A preferred embodiment of the present invention will be described below with reference to the accompanying drawings.

Figure 1:
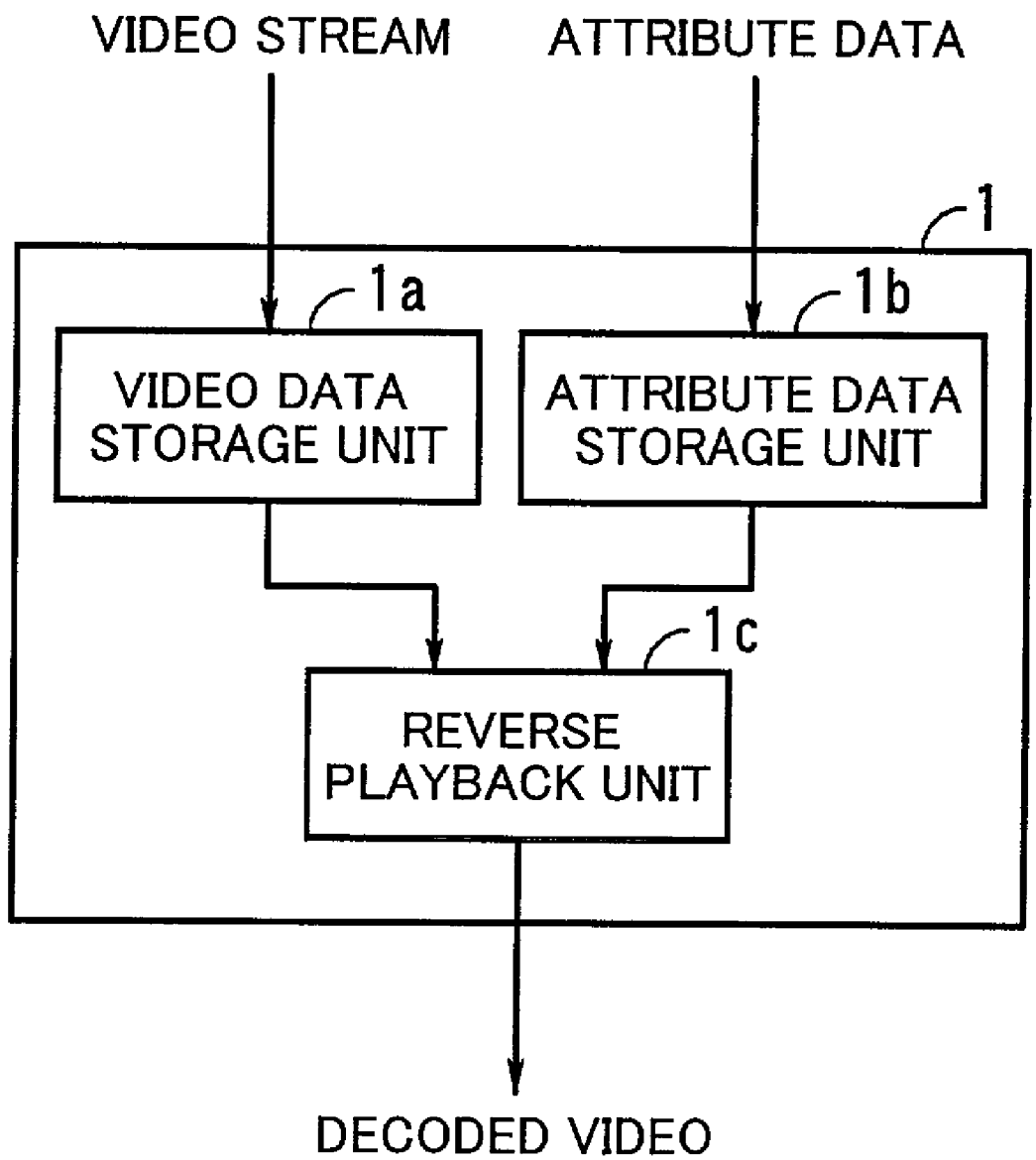
FIG. 1 is a conceptual view of a video decoding device according to the present invention.

FIG. 1 is a conceptual view of a video decoding device according to the present invention. As seen, the proposed video decoding device 1 comprises a video data storage unit 1a, an attribute data storage unit 1b, and a reverse playback unit 1c.

The video data storage unit 1a stores pictures constituting a video stream that is being played back. The attribute data storage unit 1b stores attribute data which describes how to display each picture. While FIG. 1 illustrates these two storage units 1a and 1b as separate elements, it is also possible to implement them as a unified block.

The reverse playback unit 1c makes access to the attribute data storage unit 1b when playing the given video data in the reverse direction. It determines whether each picture's repeat-first-field flag (repeat_first_field) is set or cleared. If the repeat-first-field flag of a picture is set (i.e., repeat_first_field=1), the first and second fields of that picture are read and displayed in the same order as in the forward playback mode. If the repeat-first-field flag is cleared (i.e., repeat_first_field=0), the first and second fields of that picture are read and displayed in the opposite order to that in the forward playback mode.

Figure 2:
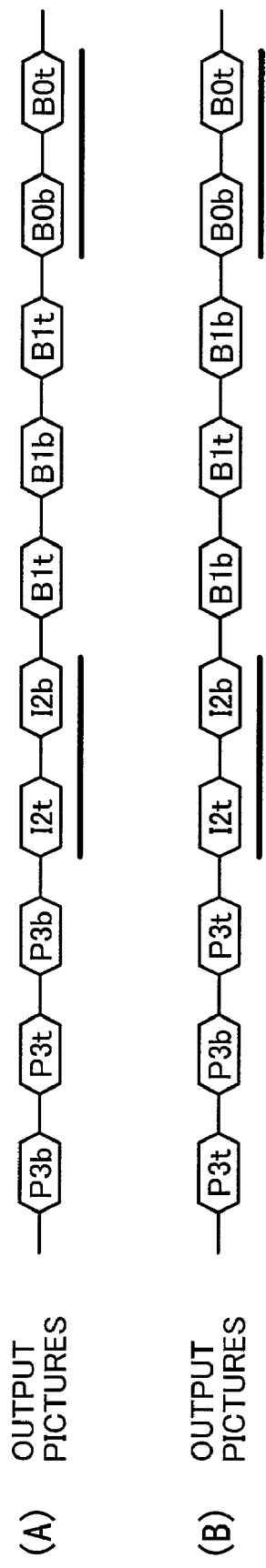
FIG. 2 is a timing diagram which shows the operation of the proposed video decoding device of FIG. 1.

Referring now to FIG. 2, the operation of the proposed video decoding device will be explained. FIG. 2 is a timing diagram which shows how the proposed device plays back a video bitstream containing pictures B0, B1, I2, and P3.

The video data storage unit 1a in the proposed video decoding device 1 accepts a series of pictures B0, B1, I2, and P3, and stores them in separate memory areas. The attribute data storage unit 1b accepts attribute data of each picture and stores them in separate memory areas.

The reverse playback unit 1c reads out pictures from the video data storage unit 1a according to their associated attribute data stored in the attribute data storage unit 1b. The attribute data includes such parameters that describe which of the top and bottom fields should be displayed first, and whether any extra field should be inserted. More specifically, suppose that the attribute data of pictures B0, B1, I2, and P3 provides the following playback conditions:

(1) Output the top field first in B0 and B1
(2) Output the bottom field first in I2 and P3
(3) Repeat the first field in B1 and P3
(4) No field repetition required at in B0 and I2

To process the example video stream, the reverse playback unit 1c begins its task with reading out the last picture P3 from the video data storage unit 1a, in which the four pictures B0, B1, I2, and P3 are stored. Here, the first field of P3 has to be repeated, and that first field should be the bottom field, as specified in the above playback conditions (3) and (2), respectively.

As previously described, the reverse playback unit 1c is designed to output the fields of a given picture in either way of the following:

(a) in the same order as in the forward playback mode if its repeat-first-field flag is set, or
(b) in the opposite order to that in the forward playback mode if the repeat-first-field flag is not set.

Since the former processing rule (a) is the case, the reverse playback unit 1c reads and outputs the bottom field P3b first. This is followed by the top field P3t and then the bottom field P3b again.

The reverse playback unit 1c now proceeds to the next picture I2. Here, the attribute data of I2 requires that the bottom field be displayed first, and no field be repeated, as seen in the playback conditions (2) and (4), respectively. Since the processing rule (b) is applicable to I2, the reverse playback unit 1c reads and outputs the top field I2t first, and then the bottom field I2b.

Subsequently, the reverse playback unit 1c proceeds to the next picture B1. Since the playback conditions (1) and (3) and processing rule (a) apply to the picture B1, the reverse playback unit 1c reads and outputs the top field B1t first, then the bottom field B1b, and the top field B1t again.

Further, the reverse playback unit 1c processes the next picture B0. Since the playback conditions (1) and (4) and processing rule (b) apply to the picture B0, the reverse playback unit 1c reads and outputs the bottom field B0b first and then the top field B1b.

The above processing steps result in a sequence of pictures shown in part (A) of FIG. 2. For comparison, the picture sequence produced with the conventional method is shown in part (B) of FIG. 2. It would then be noticed that the output picture sequence (A) maintains the alternating order of top fields and bottom fields, whereas the conventional output picture sequence (B) includes consecutive top fields and consecutive bottom fields which cause jaggies. In this way, the proposed video decoding device 1 offers a smooth sequence of pictures, thus realizing jaggy-free reverse playback.

Figure 3:
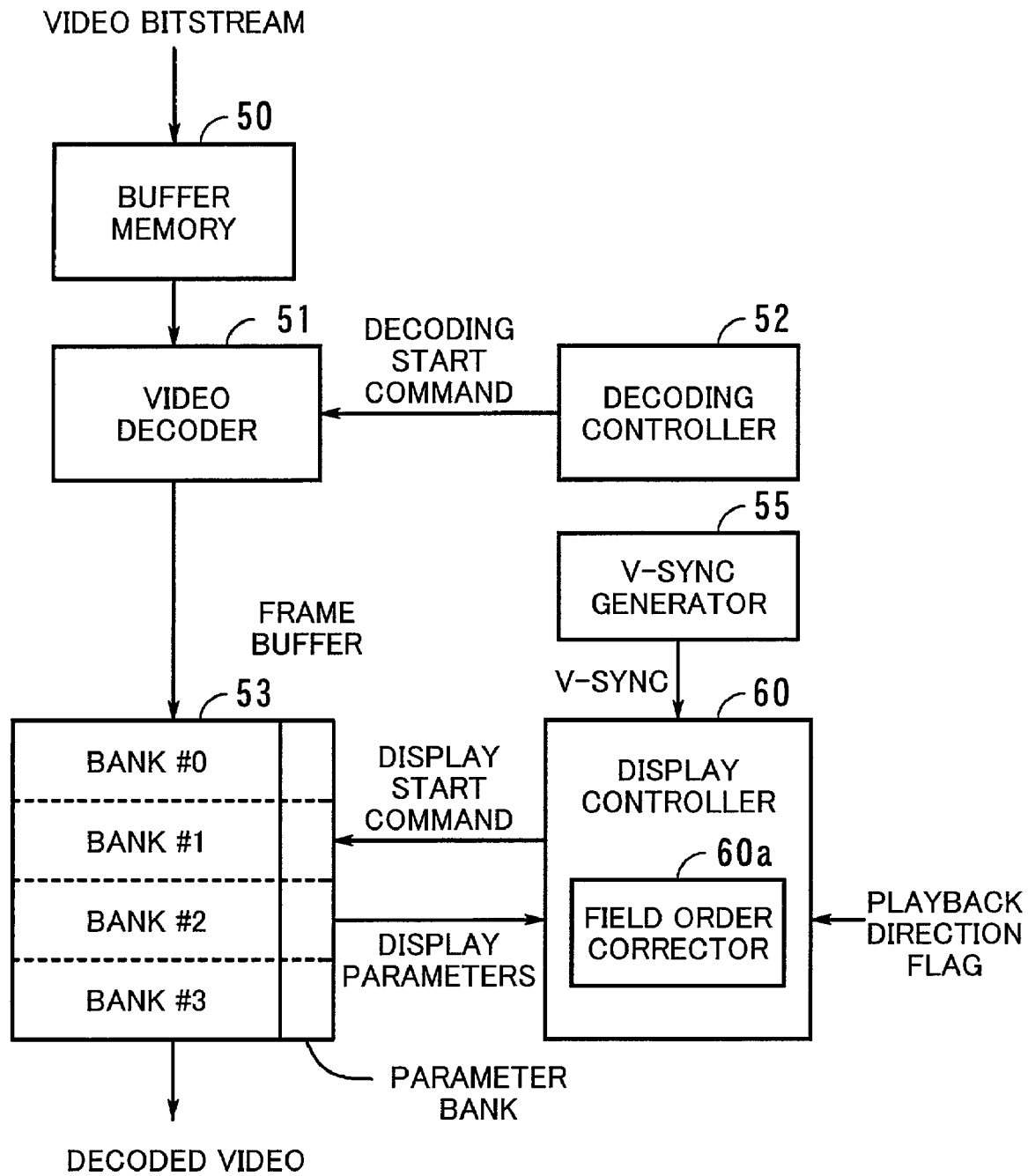
FIG. 3 is a block diagram of an embodiment of the present invention.

A more specific embodiment will now be explained below. FIG. 3 is a block diagram of an embodiment of the present invention. As seen, the video decoding device of the present invention comprises a buffer memory 50, a video decoder 51, a decoding controller 52, a frame memory 53, a display controller 60, and a v-sync generator 55.

The buffer memory 50 serves as a temporary storage space for buffering an incoming video bitstream. The video decoder 51 decodes video data stored in the buffer memory 50 in response to a decoding start command given from the decoding controller 52, and it stores the decoded I, P, and B pictures into the frame memory 53. The decoding controller 52 controls video decoding processes, including issuance of decoding start commands to the video decoder 51.

The frame memory 53 has the capacity of four pictures (or four frames), the space of which is segmented into four sections to store individual pictures produced by the video decoder 51. The display controller 60 determines the direction of playback operation according to a playback direction flag which indicates whether it is forward playback or reverse playback. The display controller 60 also provides the frame memory 53 with display start commands in synchronization with a vertical synchronization (v-sync) signal. Further, the display controller 60 determines in what order to read pictures when displaying a video stream, consulting relevant display parameters stored in the frame memory 53.

Figure 15:
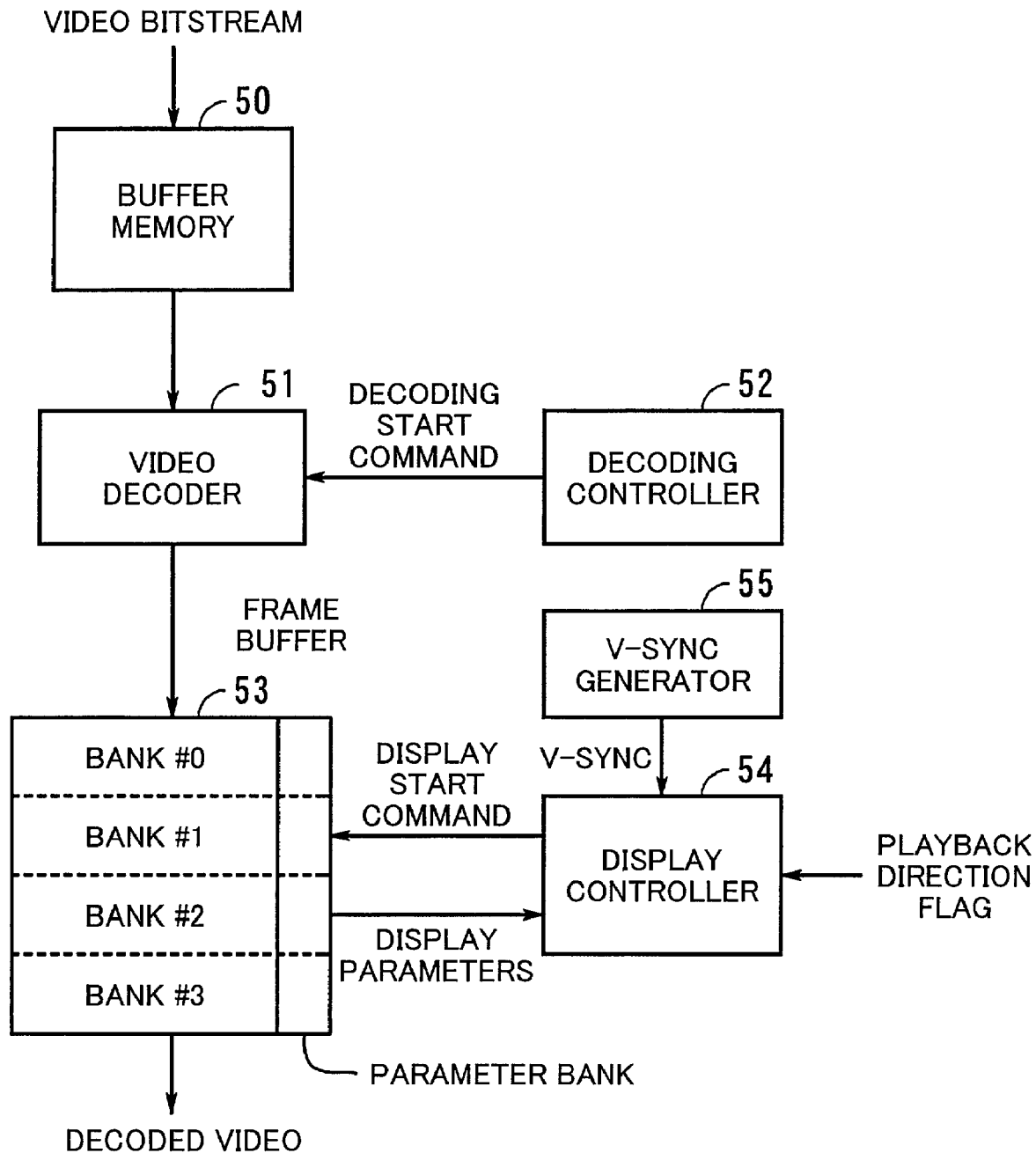
FIG. 15 shows a typical configuration of a conventional video decoding device.
Figure 16:
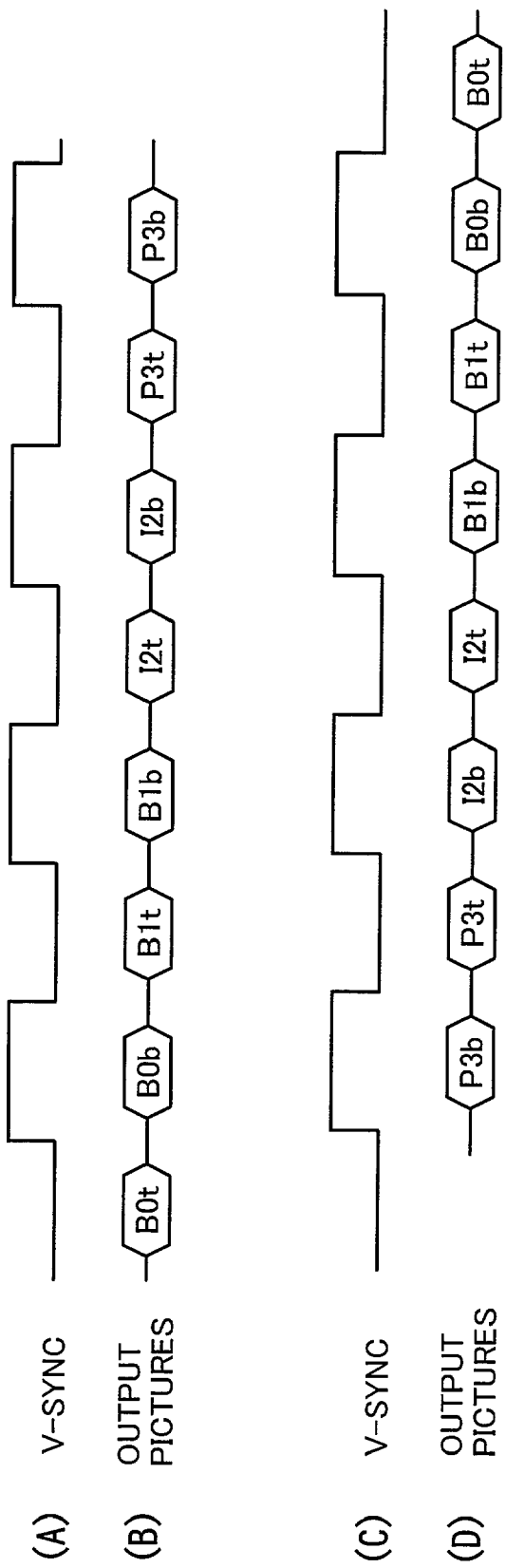
FIG. 16 is a timing diagram which explains the operation of the conventional video decoding device of FIG. 15.
Figure 17:
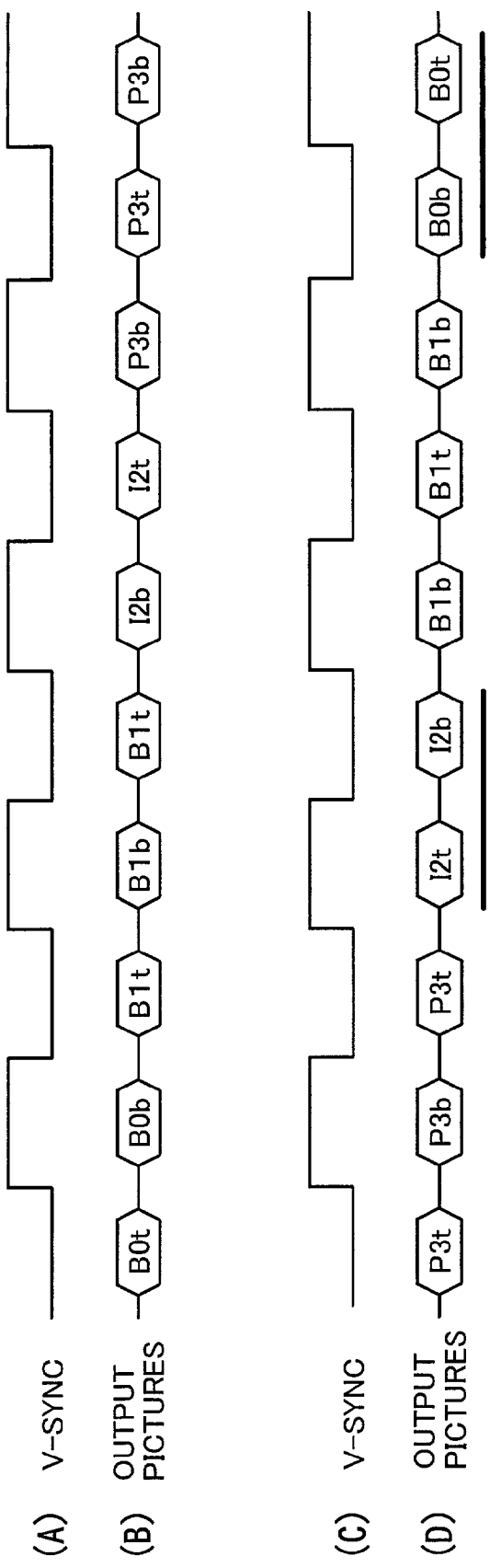
FIG. 17 is another timing diagram which explains the operation of the conventional video decoding device of FIG. 15.
Figure 18:
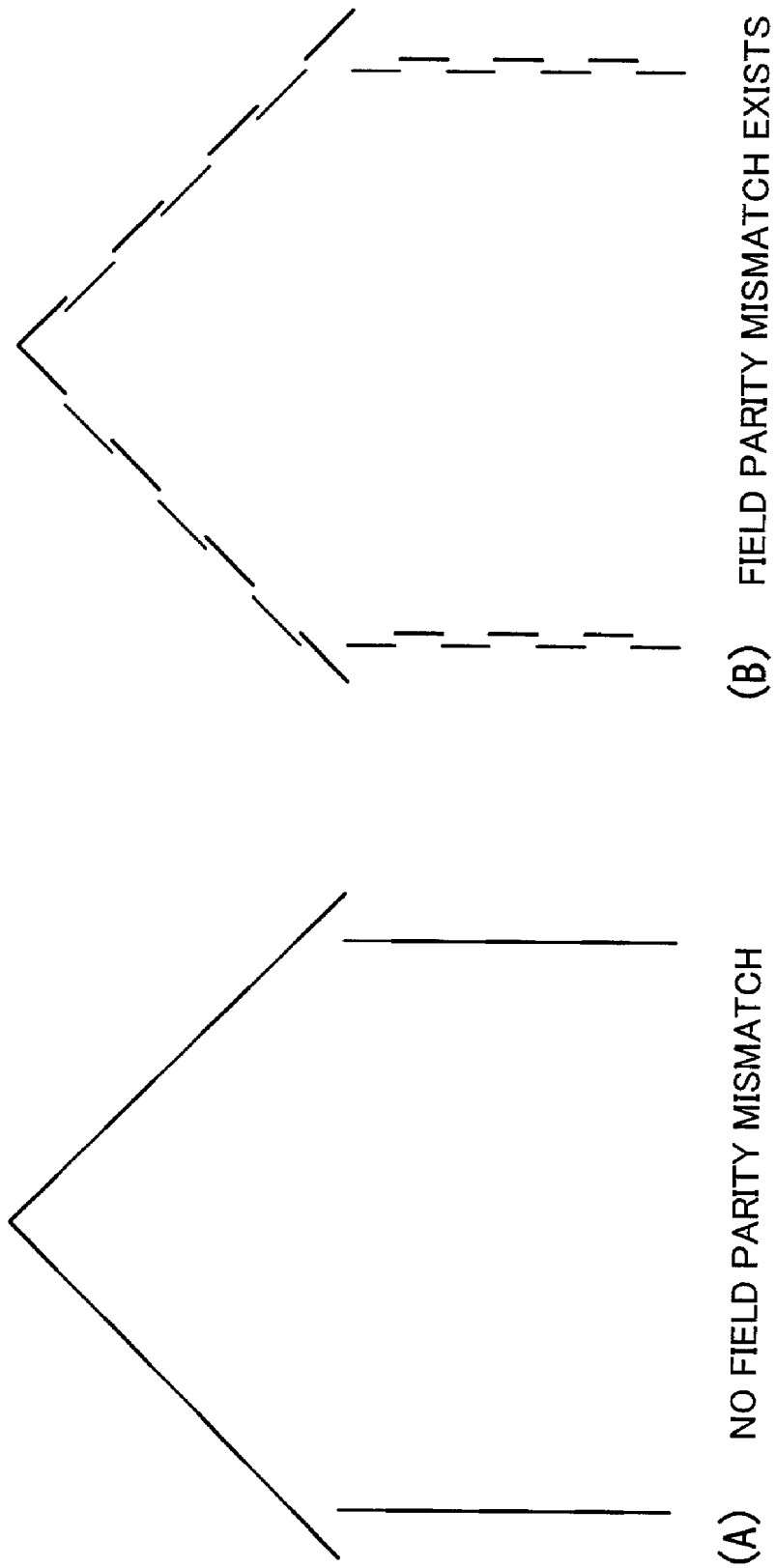
FIG. 18 shows jaggies appearing on a 3:2 pull-down video which is produced by the conventional video decoding device of FIG. 15 operating in reverse playback mode.

According to the present invention, the display controller 60 operates differently from the conventional display controller 54 explained earlier in FIG. 15 because of the presence of a field order corrector 60a, while other elements are similar to those shown in FIG. 15. More specifically, the field order corrector 60a provides the functions of the reverse playback unit 1c explained in FIG. 1, correcting the order of output picture fields when playing back a given video stream in the reverse direction. The field order corrector 60a makes the display controller 60 change the interpretation of the "top field first" flag when "repeat_first_field" is "1," so that the field parity will be maintained properly even in the reverse playback mode. In other words, the field order corrector 60a permits the display controller 60 to serve as the reverse playback unit 1c shown in FIG. 1. The next section explains more about the operation of the proposed embodiment including such a display controller 60, starting with a brief description of parameters used, and then proceeding to a more specific example of video decoding processes.

FIG. 4 shows a set of parameters used in the present embodiment. As seen, the parameters include those for sequence layer, Group of Pictures (GOP) layer, and picture layer.

The sequence layer parameters include the following values:
    horizontal_size_value
    vertical_size_value
    frame_rate_code
    display_horizontal_size
    display_vertical_size where "horizontal_size_value" and "vertical_size_value" specify the horizontal size and vertical size of the picture, respectively; "frame_rate_code" specifies which video frame rate to produce, for National Television Standards Committee (NTSC) or for Phase Alternating Line (PAL); and "display_horizontal_size" and "display_vertical_size" specify the horizontal and vertical display size in which a decoded picture is to be displayed.

The GOP layer parameters include the following values:
    closed_gop
    broken_link where "closed_gop" is a flag indicating that it is possible to decode and display B-pictures at the beginning of the current GOP, whereas "broken_link" indicates it is not.

The picture layer paramters includes the following values:
    top_field_first
    repeat_first_field
    frame_center_horizontal_offset
    frame_center_vertical_offset where "top_field_first" indicates that the first field of the current picture is to be displayed first; "repeat_first_field" indicates that the first field is to be repeated; and "frame_center_horizontal_offset" and "frame_center_vertical_offset" are pan-scan parameters specifying the horizontal and vertical positions of a cropped picture.

Figure 5:
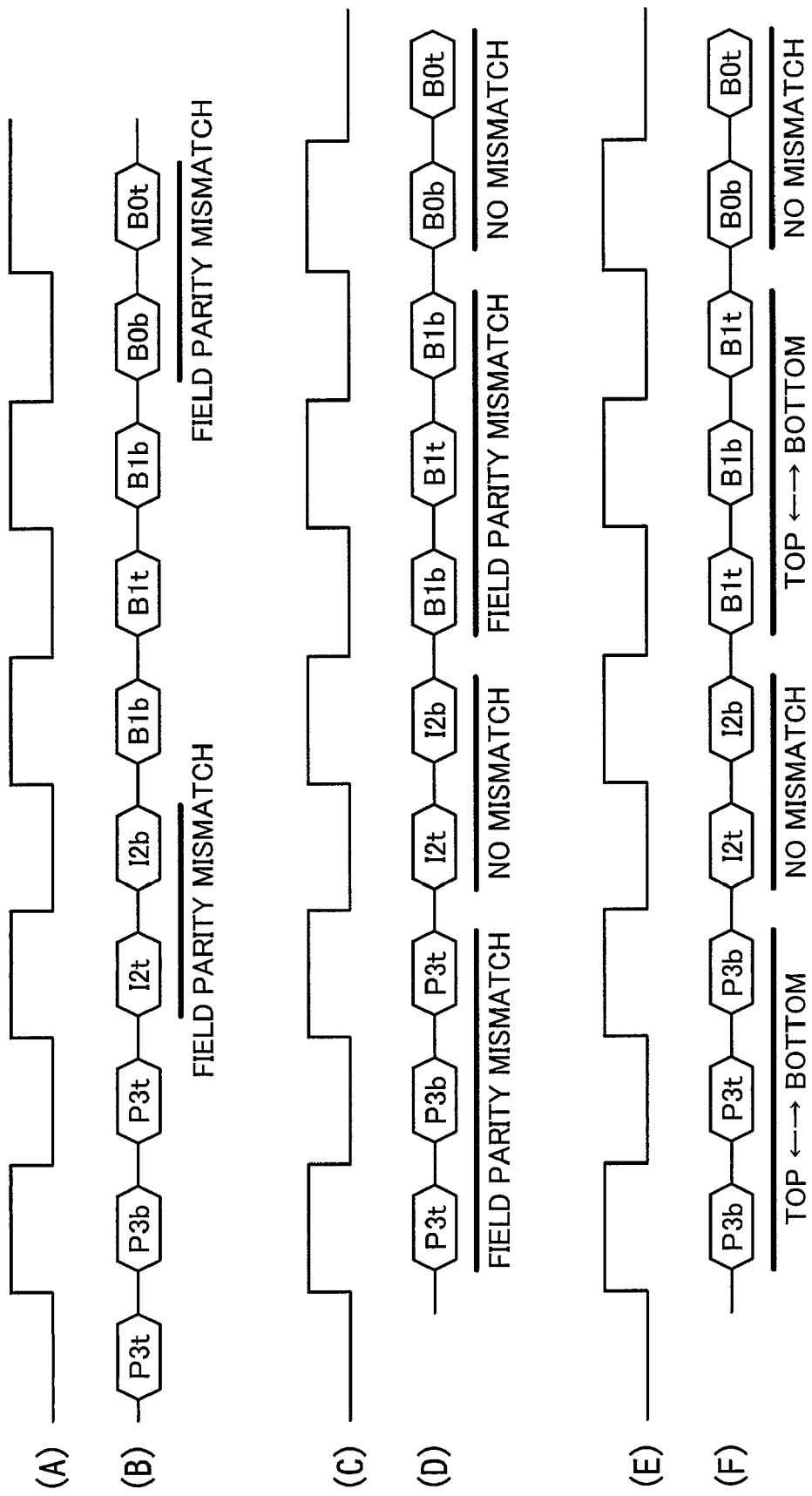
FIG. 5 is a timing diagram which shows the basics about how the present embodiment works.

According to the present embodiment, the video decoding device of FIG. 3 operates as follows. FIG. 5 is a timing diagram which shows three possible picture sequences (B), (D), and (F), together with v-sync signals (A), (C), and (E) for timing reference. As mentioned earlier, top fields are supposed to be displayed when v-sync is low, while bottom fields are supposed to be displayed when v-sync is high. This timing constraint, called the "field parity," should be observed not to cause jaggies.

Referring to FIG. 5, the first picture sequence (B) is an example of 3:2 pulldown video produced with a conventional method. This sequence (B) causes jaggies at the frames consisting of two fields (i.e., repeat_first_field=0, or no extra field is inserted). Note that such two-field frames (e.g., I2 and B0) have incorrect field parity. The other frames with repeat_first_field=1 are jaggy-free because of their correct field parity.

With the above fact in mind, we now attempt to solve the problem of the conventional device. First, we move the whole picture sequence (B) along the time axis by one field period (or half a v-sync cycle), thus yielding a shifted picture sequence (D) shown in FIG. 5. While correcting I2 and B0, this operation produces mismatch of field parity in other pictures P3 and B1, meaning that jaggies may occur in those pictures. Then we modify the picture sequence (D) in such a way that the top fields and bottom fields change places within the frames of P3 and B1. This operation creates a good picture sequence (F) shown in the bottommost row of FIG. 5, in which no field mismatch exists.

The above-described manipulation of field arrangement is justified by the following nature of 3:2 pulldown video. When displaying a picture having the attribute of repeat_first_field=1, the display controller 60 inserts an additional field into the output video stream by repeating the top field or bottom field of that picture. Such extra fields are inserted merely to increase the frame rate from 24 fps to 30 fps. Take picture P3, for example. While this picture P3 may actually be rendered in the form of "P3$t$→P3$b$→P3$t$" or "P3$b$→P3$t$→P3$b$," depending on the value of "top_field_first" parameter, these two patterns have no substantial difference in terms of the smoothness of reproduced images. That is, in a practical sense, it would be acceptable to change the order of top fields and bottom fields when displaying such three-field pictures, and by making such a change, every output picture will have correct field parity throughout the produced sequence as shown in part (F) of FIG. 5. In this way, the video decoding device can provide a jaggy-free 3:2 pull-down video.

The above discussion has brought the following algorithm. When playing back 3:2 pulldown videos in the reverse direction, the video decoding device shall process the pictures with the attribute of repeat_first_field=1, without inverting the parameter value of top_field_first, but in the same way as in the forward playback mode. (In other words, the proposed algorithm violates the conventional rule of inverting top_field_first in reverse playback mode.) The video decoding device, however, applies the conventional rule to the pictures with the attribute of repeat_first_field=0. That is, the top_field_first parameter shall be interpreted reversely for those pictures.

The above video display algorithm permits all 3:2 pulldown pictures to satisfy the field parity constraints even in reverse playback mode, thus yielding a smooth sequence of motion images. The next section will provide more details about the present embodiment of FIG. 3.

Referring again to FIG. 3, suppose that the video decoding device is receiving an MPEG bitstream of 3:2 pulldown video. The incoming bitstream is temporarily stored in the buffer memory 50 and then supplied to the video decoder 51. The decoding controller 52 issues decoding start commands, causing the video decoder 51 to reproduce motion pictures by decoding the bitstream sent from the buffer memory 50 in accordance with the syntax of MPEG video formats. The resultant pictures are supplied to the frame memory 53, and their display parameters are extracted and stored into appropriate storage areas associated with each picture bank of the frame memory 53.

Consider here that four pictures I2, B0, B1, and P3 have been decoded and stored in the banks #2, #0, #1, and #3, respectively, and their corresponding parameters are stored in the associated parameter areas. FIG. 6 shows an example of parameter settings in 3:2 pull-down video. The parameter values specified in this example are as follows.

The first parameter "horizontal_size_value" in the table represents the horizontal picture size. This parameter is set to "704" for all pictures, as indicated by the left arrows "←" which are used as ditto symbols in FIG. 6. The next parameter "vertical_size_value" represents the vertical size, which is set to "480" for all pictures. The third parameter "frame_rate_code" specifies which frame rate to provide, NTSC or PAL. This parameter is set to "0100" for all pictures. The subsequent two parameters "display_horizontal_size" and "display_vertical_size" specify a display size, which are set to "704" and "480," respectively, for all pictures.

Further, the sixth parameter "closed_gop" indicates that it is possible to decode and display B-pictures at the beginning of the current GOP, when it is set to "1." Pictures B0 and B1 have a value of "1" for this parameter, while I2 and P3 have no specified value. The seventh parameter "broken_link," when it is set to "1," indicates that it is not possible to decode and display B-pictures at the beginning of the current GOP. Pictures B0 and B1 have a value of "0" for this parameter, while I2 and P3 have no specified value.

The seventh parameter "top_field_first" indicates that the first field of the current picture is to be displayed first, when it is set to "1." This parameter is set to "1" for pictures B0 and B1, while it is "0" for the other pictures I2 and P3. The eighth parameter "repeat_first_field" indicates that the first field is to be repeated. This parameter is set to "1" for pictures B1 and P3 and "0" for pictures B0 and I2. Lastly, the pan-scan parameters "frame_center_horizontal_offset" and "frame_center_vertical_offset, which specify the horizontal and vertical positions of a cropped picture, have no particular values in any of the four pictures in the present example.

FIG. 7 shows an example of parameter settings in normal video. Compared with the parameters for 2:3 pulldown video explained in FIG. 6, the normal video parameters are distinct in the setup of "top_field_first" and "repeat_first_field." More specifically, "top_field_first" is set to "1" for all pictures, and "repeat_first_field" is set to "0" for all pictures.

The pictures decoded in the above processing will now be displayed as follows. The display controller 60 detects every falling edge of the v-sync signal supplied from the v-sync generator 55, and then it reads display parameters out of one of the parameter banks corresponding to the next picture to be displayed. Since the four pictures are arranged in the order of B0, B1, I2, and P3, assuming forward playback, the display controller 60 starts its task with fetching the parameters of the last picture P3. The display controller 60 determines how to display the picture P3 of interest, according to the parameters read out of the relevant bank. Since the parameters of P3 are defined as shown in FIG. 6, the display controller 60 identifies that the picture P3 is 704×480 pixels in size, and that its top field should be displayed first.

Having parsed the display parameters, the display controller 60 retrieves picture data from the frame memory 53 for display. In the present example, the display controller 60 reads out the data of picture P3 from the bank #3 since it has just finished the parameters of picture P3.

More specifically, the display controller 60 identifies the combination of top_field_first=0 and repeat_first_field=1 among the parameters of P3. Since this combination suggests the use of the foregoing processing rule (a), the display controller 60 follows the normal field order as in the forward playback mode, thus outputting the field data of P3 in the order of P3b, P3t, and P3b.

The display controller 60 then reads the parameters of I2 and identifies the combination of top_field_first=0 and repeat_first_field=0. Since this combination suggests the use of the foregoing processing rule (b), the display controller 60 determines the order of fields in the opposite way to what is assumed in the forward playback mode. As a result, the top field I2t and bottom field I2b are displayed in that order.

Similarly, the display controller 60 fetches the parameters of B1 and identifies the combination of top_field_first=1 and repeat_first_field=1. Since this combination of parameters suggests the use of the foregoing processing rule (a), the display controller 60 follows the normal field order as in the forward playback mode, thus outputting field data of B1 in the order of B1t, B1b, and B1t.

Subsequent to the above, the display controller 60 reads out the parameters of B0 and identifies the combination of top_field_first=1 and repeat_first_field=0. Since this combination suggests the use of the foregoing processing rule (b), the display controller 60 determines the order of fields in the opposite way to what is assumed in the forward playback mode. As a result, the bottom field B0b and top field B0t come out in this order.

Figure 8:
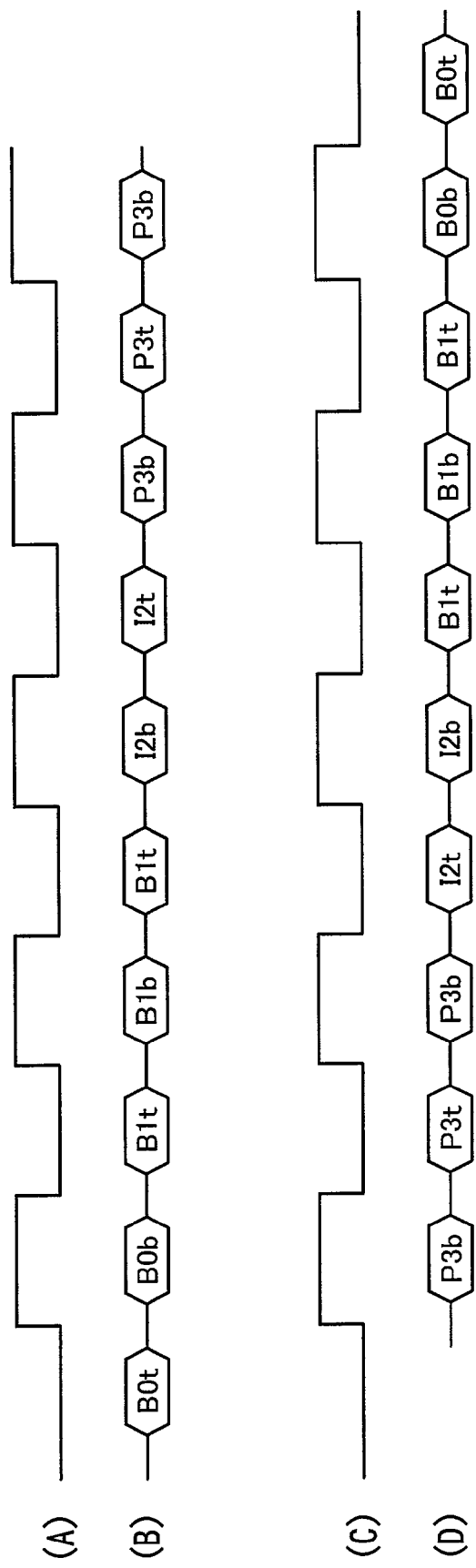
FIG. 8 is a timing diagram which shows the operation of the present embodiment.

FIG. 8 shows a forward-playback picture sequence (B) produced with a conventional method and a reverse-playback picture sequence (D) produced through the above-described process of the present embodiment. Both sequences (B) and (D) are depicted together with v-sync signals (A) and (C) for the purpose of timing reference. As seen from FIG. 8, the present embodiment ensures that the top fields and bottom fields be aligned alternately throughout the sequence. It should be noted that every bottom field appears when the v-sync signal is high, and every top field appears when the v-sync signal is low. That is, the present embodiment maintains correct and consistent field parity which is required in interlaced video, and thus enables smooth reverse playback of 2:3 pulldown motion pictures.

Figure 9:
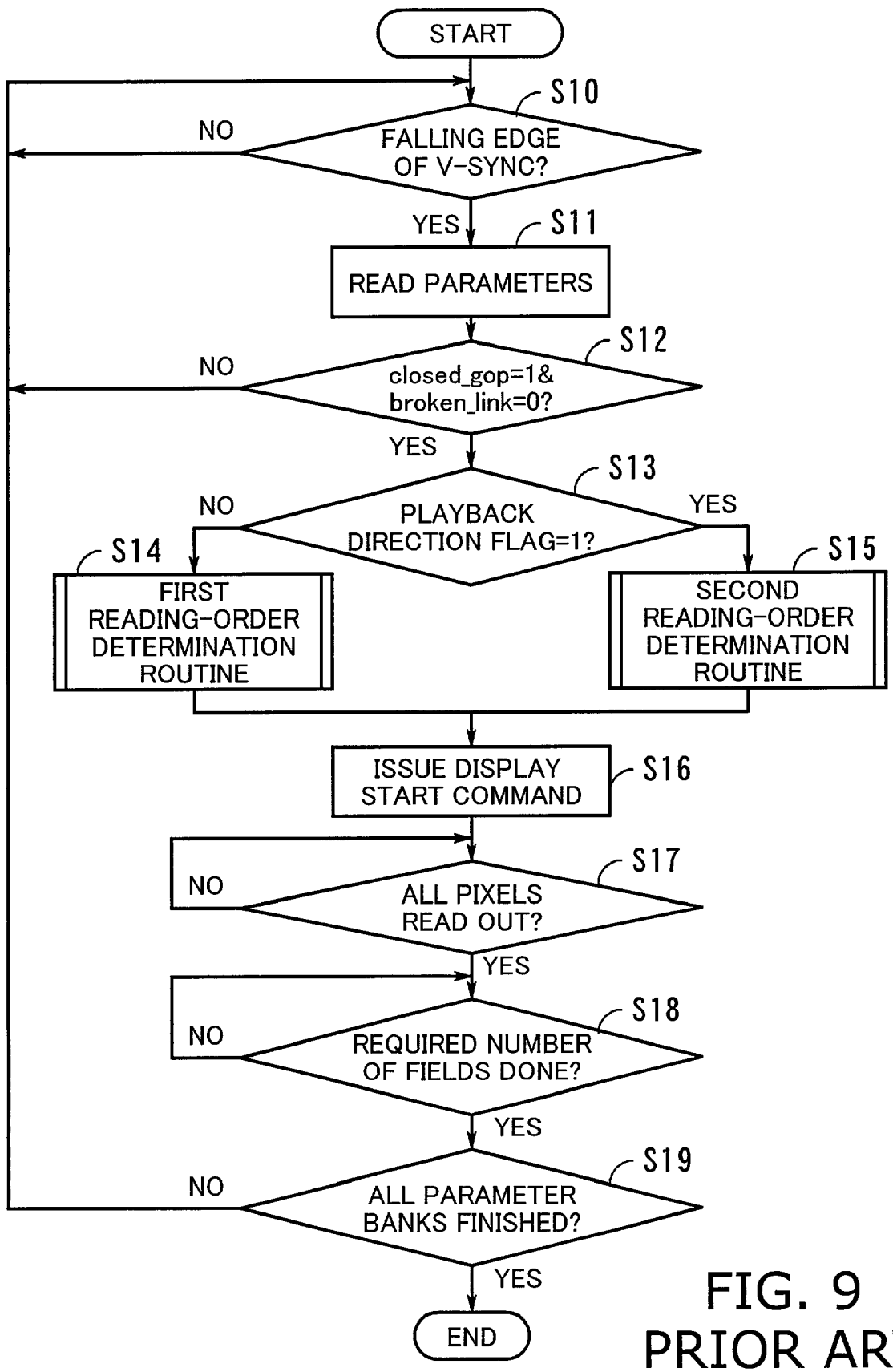
FIG. 9 is a flowchart which explains the operation of a conventional video decoding device.
Figure 10:
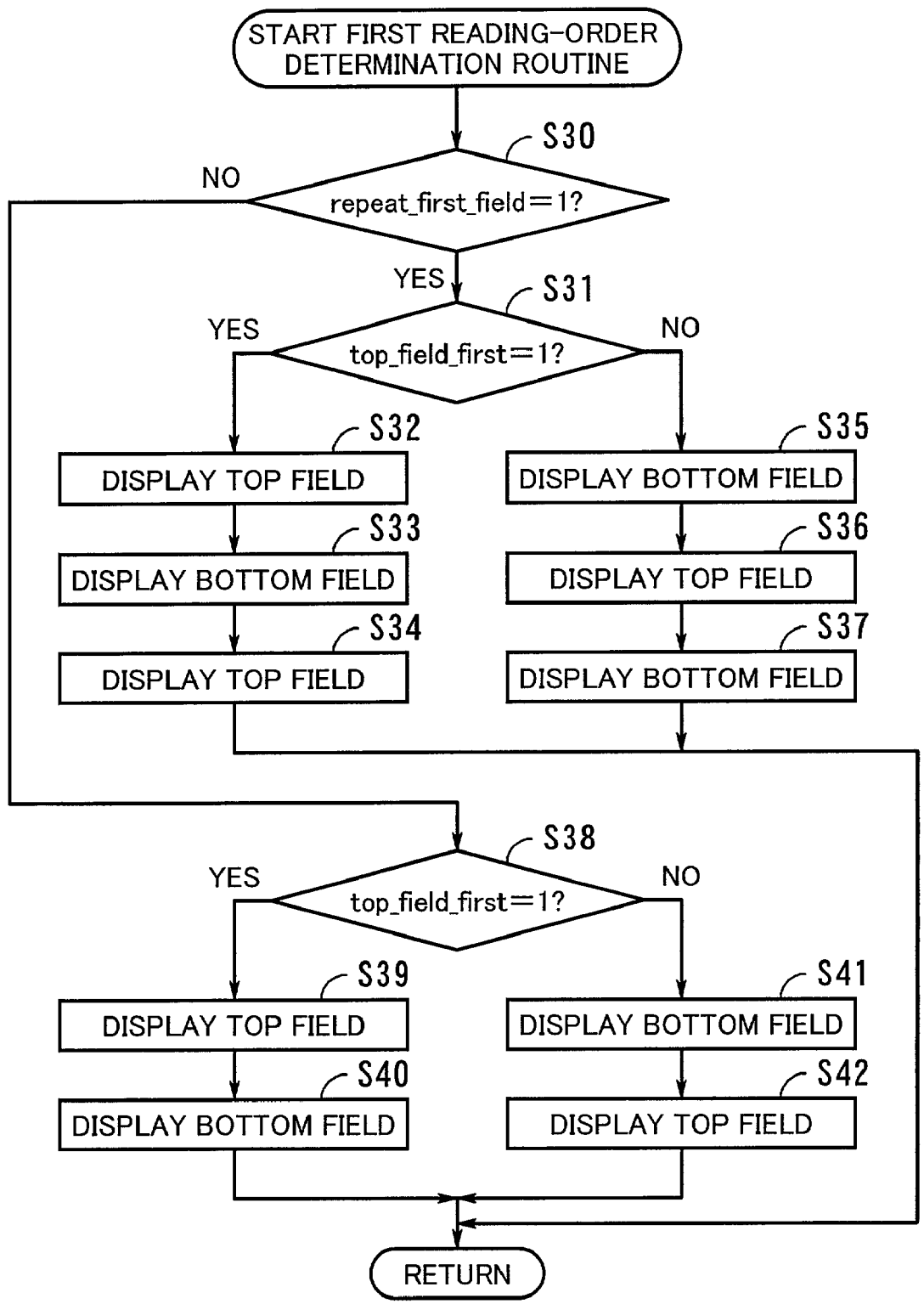
FIG. 10 is a flowchart which explains the details of a conventional first reading-order determination process called at step S14 in the process of FIG. 9.
Figure 11:
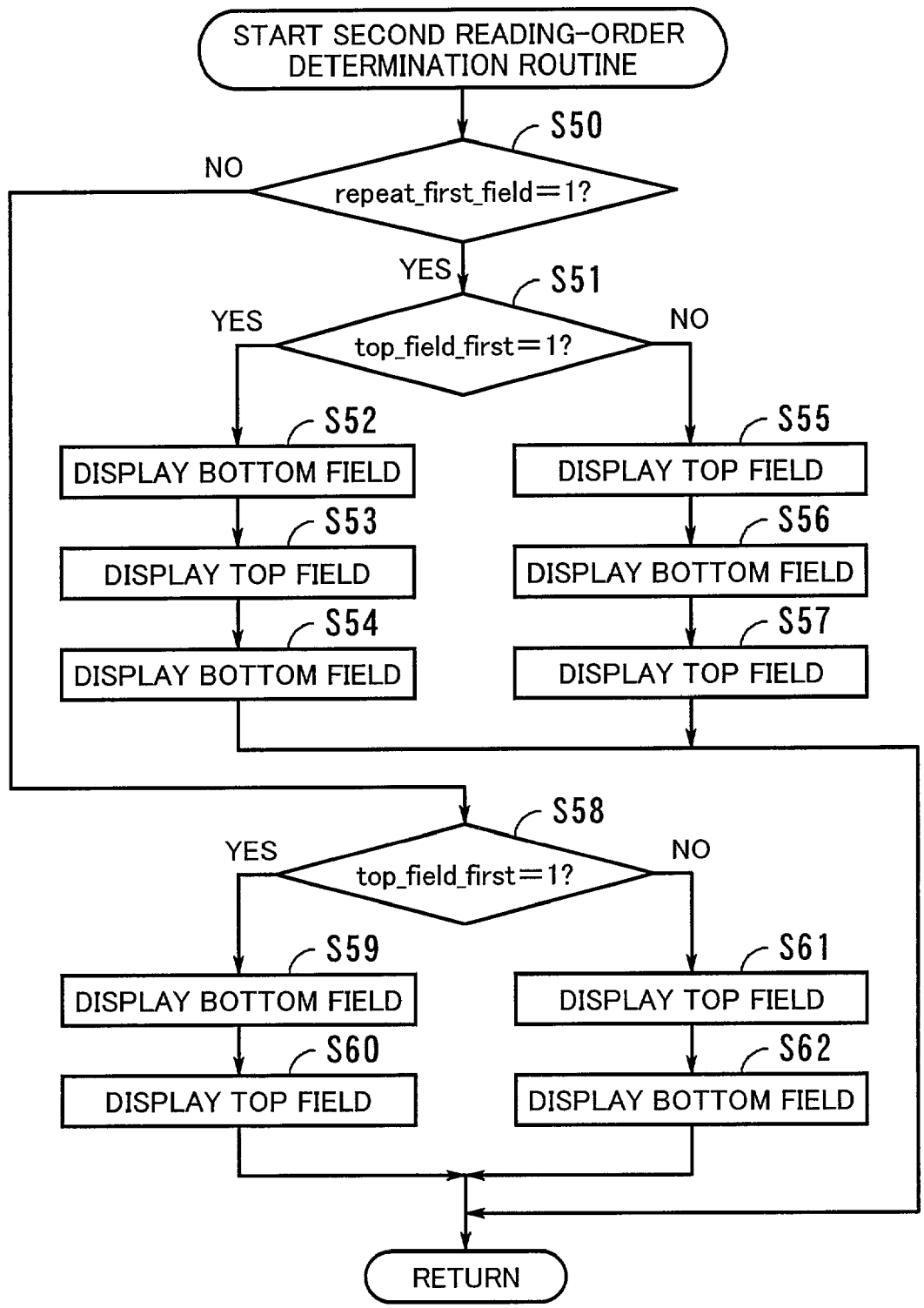
FIG. 11 is a flowchart which explains the details of a conventional second reading-order determination process called at step S15 in the process of FIG. 9.

Referring now to the flowcharts of FIGS. 9 to 14, the next section will compare the proposed video display method with a conventional method. FIGS. 9 to 11 are flowcharts of a conventional video display method, which comprises the following steps:

STEP S10:
The display controller 54 observes the v-sync signal supplied from the v-sync generator 55 to detect its falling edge. If a falling edge is detected, the process advances to step S11. Otherwise, it repeats the current step S10.

STEP S11:
The display controller 54 reads out a set of parameters from the frame memory 53.

STEP S12:
The display controller 54 determines whether closed_gop is set to "1" and bloken_link is set to "0." If these two conditions are both true, the process advances to step S13. Otherwise, it returns to step S10 to repeat the above processing.

STEP S13:
The display controller 54 determines whether the playback direction flag is set to "1" (reverse playback). If so, the process advances to step S15. If not, the process proceeds to step S14.

STEP S14:
The display controller 54 calls a first reading-order determination routine, the details of which will be described later.

STEP S15:
The display controller 54 calls a second reading-order determination routine, the details of which will be described later.

STEP S16:
The display controller 54 issues a display start command.

STEP S17:
The display controller 54 determines whether all pixels have been read out of the frame memory 53. If so, the process advances to step S18. If not, the process repeats this step S17. More specifically, the display controller 54 examines the number of processed pixels in this step S17, waiting until the number reaches the value of (display_horizontal_size×display_vertical_size).

STEP S18:
The display controller 54 determines whether all the required number of fields have been finished. If so, the process advances to step S19. If not, the process repeats the current step S18.

STEP S19:
The display controller 54 determines whether all parameter banks are finished. If so, the process is terminated. If not, the display controller 54 returns to the first step S10 execute the above steps for the next unfinished parameter bank.

Referring to FIG. 10, the details of the first reading-order determination routine is shown. When this routine is called at step S14 in FIG. 9, the following steps are executed:

STEP S30:
The display controller 54 determines whether repeat_first_field is set to "1." If so, the process advances to step S31. If not, the process proceeds to step S38.

STEP S31:
The display controller 54 determines whether top_field_first is ste to "1." If so, the process advances to step S32. If not, the process proceeds to step S35.

STEP S32:
The display controller 54 makes access to the current bank of the frame memory 53 to read and display the top field.

STEP S33:
The display controller 54 makes access to the same to read and display the bottom field.

STEP S34:
The display controller 54 makes access to the same to read and display the top field again. It then exits from the current routine, thus returning to the calling process.

STEP S35:
The display controller 54 makes access to the current bank of the frame memory 53 to read and display the bottom field.

STEP S36:
The display controller 54 makes access to the same to read and display the top field.

STEP S37:
The display controller 54 makes access to the same to read and display the bottom field again. It then exits from the current routine, thus returning to the calling process.

STEP S38:
The display controller 54 determines whether top_field_first is set to "1." If so, the process advances to step S39. If not, the process proceeds to step S41.

STEP S39:
The display controller 54 makes access to the current bank of the frame memory 53 to read and display the top field.

STEP S40:
The display controller 54 makes access to the same to read and display the bottom field. It then exits from the current routine, thus returning to the calling process.

STEP S41:
The display controller 54 makes access to the current bank of the frame memory 53 to read and display the bottom field.

STEP S42:
The display controller 54 makes access to the same to read and display the bottom field. It then exits from the current routine, thus returning to the calling process.

Referring to FIG. 11, the details of the second reading-order determination routine is shown. When this routine is called at step S15 in FIG. 9, the following steps are executed:

STEP S50:
The display controller 54 determines whether repeat_first_field is set to "1." If so, the process advances to step S51. If not, the process proceeds to step S58.

STEP S51:
The display controller 54 determines whether top_field_first is set to "1." If so, the process advances to step S52. If not, the process proceeds to step S55.

STEP S52:
  The display controller 54 makes access to the current bank of the frame memory 53 to read and display the bottom field.
STEP S53:
  The display controller 54 makes access to the same to read and display the top field.
STEP S54:
  The display controller 54 makes access to the same to read and display the bottom field again. It then exits from the current routine, thus returning to the calling process.
STEP S55:
  The display controller 54 makes access to the current bank of the frame memory 53 to read and display the top field.
STEP S56:
  The display controller 54 makes access to the same to read and display the bottom field.
STEP S57:
  The display controller 54 makes access to the same to read and display the top field again. It then exits from the current routine, thus returning to the calling process.
STEP S58:
  The display controller 54 determines whether top_field_first is set to "1." If so, the process advances to step S59. If not, the process proceeds to step S61.
STEP S59:
  The display controller 54 makes access to the current bank of the frame memory 53 to read and display the bottom field.
STEP S60:
  The display controller 54 makes access to the same to read and display the top field again. It then exits from the current routine, thus returning to the calling process.
STEP S61:
  The display controller 54 makes access to the current bank of the frame memory 53 to read and display the top field.
STEP S62:
  The display controller 54 makes access to the same to read and display the bottom field. It then exits from the current routine, thus returning to the calling process.

Figure 12:
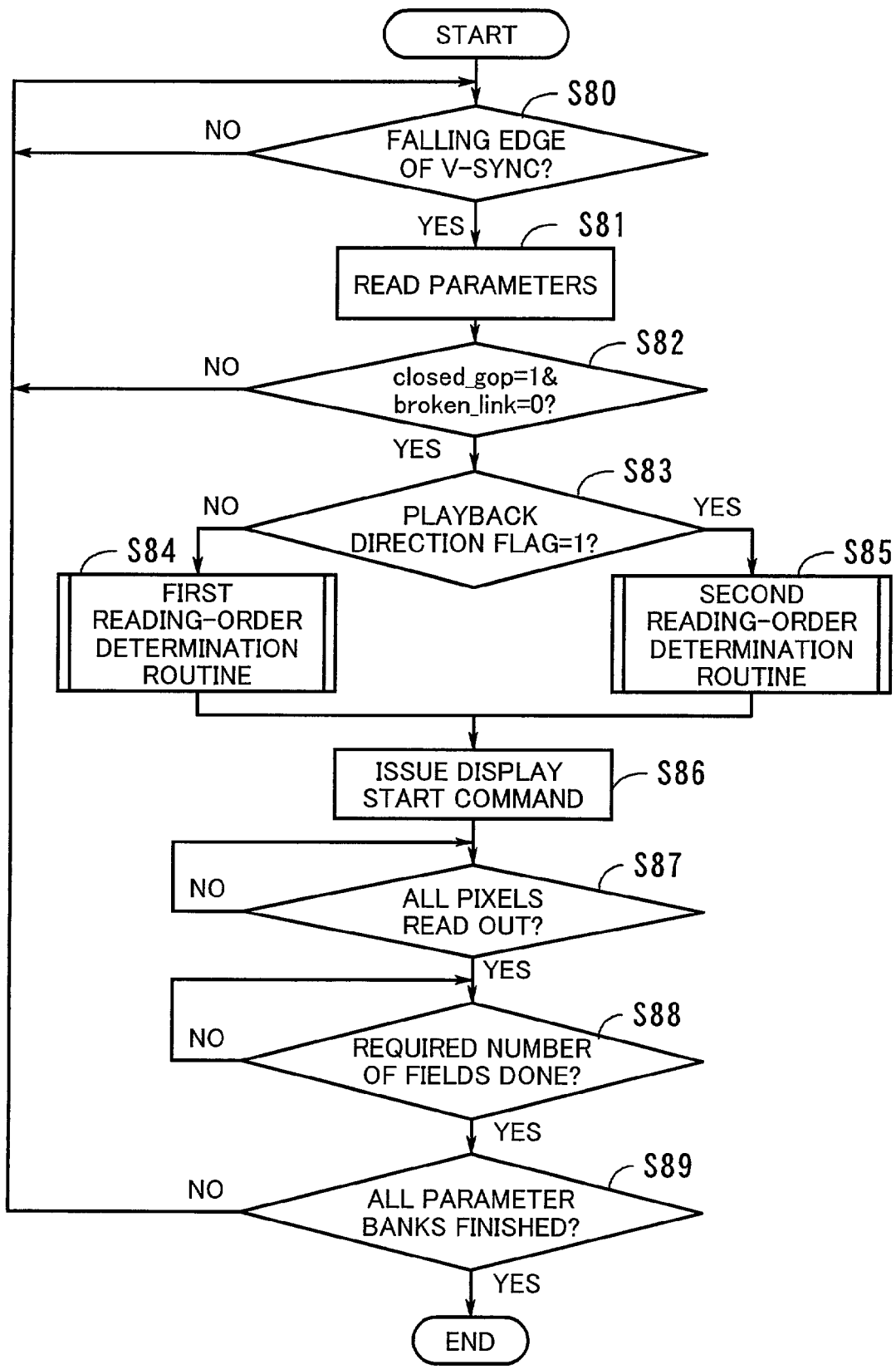
FIG. 12 is a flowchart which explains the operation of the video decoding device according to the present invention.
Figure 13:
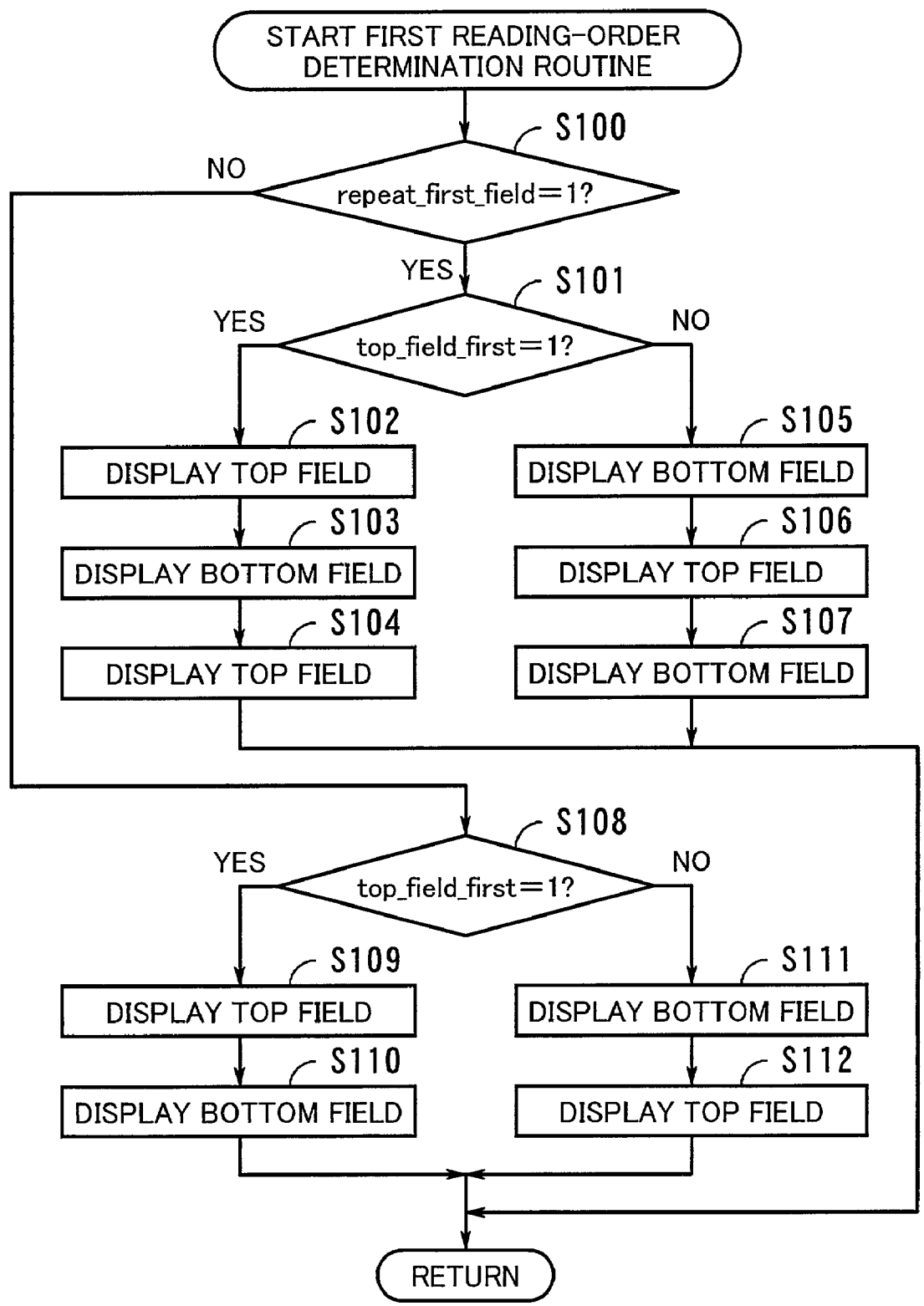
FIG. 13 is a flowchart which explains the details of a first reading-order determination process called at step S84 in the process of FIG. 12.
Figure 14:
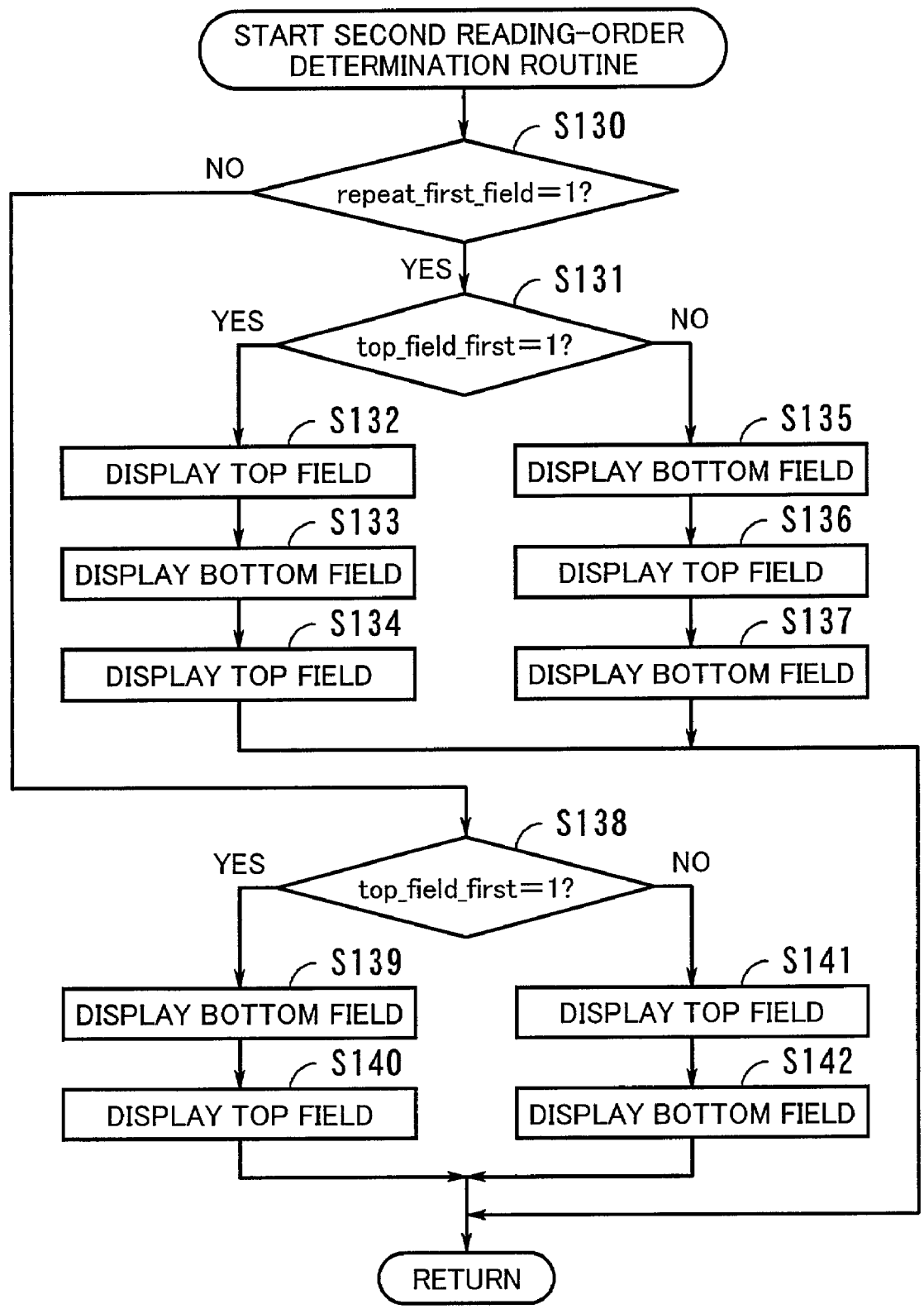
FIG. 14 is a flowchart which explains the details of a second reading-order determination process called at step S85 in the process of FIG. 12.

The operation of the conventional video decoding device have been described in FIGS. 9 to 11. Referring next to FIGS. 12 to 14, the playback operation of the proposed video decoding device will be described below. The process of FIG. 12 comprises the following steps:

STEP S80:
  The display controller 60 observes the v-sync signal supplied from the v-sync generator 55 to detect its falling edge. If a falling edge is detected, the process advances to step S81. Otherwise, it repeats the current step S80.
STEP S81:
  The display controller 60 reads out a set of parameters from the frame memory 53.
STEP S82:
  The display controller 60 determines whether closed_gop is set to "1" and bloken_link is set to "0." If these two conditions are both true, the process advances to step S83. Otherwise, it returns to step S80 to repeat the above processing.

STEP S83:
  The display controller 60 determines whether the playback direction flag is set to "1" (i.e., reverse playback mode). If so, the process advances to step S85. If not, the process proceeds to step S84.
STEP S84:
  The display controller 60 calls a first reading-order determination routine, the details of which will be described later.
STEP S85:
  The display controller 60 calls a second reading-order determination routine, the details of which will be described later.
STEP S86:
  The display controller 60 issues a display start command.
STEP S87:
  The display controller 60 determines whether all pixels have been read out of the frame memory 53. If so, the process advances to step S88. If not, the process repeats this step S87. More specifically, the display controller 60 examines the number of processed pixels in this step S87, waiting until the number reaches the value of (display_horizontal_size)×(display_vertical_size).
STEP S88:
  The display controller 60 determines whether all the required number of fields have been finished. If so, the process advances to step S89. If not, the process repeats the current step S88.
STEP S89:
  The display controller 60 determines whether all parameter banks are finished. If so, the process is terminated. If not, the display controller 60 returns to the first step S80 to execute the above steps for the next unfinished parameter bank.

Referring to FIG. 13, the details of the first reading-order determination routine is shown. When this routine is called at step S84 in FIG. 12, the following steps are executed:

STEP S100:
  The display controller 60 determines whether repeat_first field is set to "1." If so, the process advances to step S101. If not, the process proceeds to step S108.
STEP S101:
  The display controller 60 determines whether top_field_first is set to "1." If so, the process advances to step S102. If not, the process proceeds to step S105.
STEP S102:
  The display controller 60 makes access to the current bank of the frame memory 53 to read and display the top field.
STEP S103:
  The display controller 60 makes access to the same to read and display the bottom field.
STEP S104:
  The display controller 60 makes access to the same to read and display the top field again. It then exits from the current routine, thus returning to the calling process.
STEP S105:
  The display controller 60 makes access to the current bank of the frame memory 53 to read and display the bottom field.
STEP S106:
  The display controller 60 makes access to the same to read and display the top field.

STEP S107:
The display controller 60 makes access to the same to read and display the bottom field again. It then exits from the current routine, thus returning to the calling process.

STEP S108:
The display controller 60 determines whether top_field_first is set to "1." If so, the process advances to step S109. If not, the process proceeds to step S111.

STEP S109:
The display controller 60 makes access to the current bank of the frame memory 53 to read and display the top field.

STEP S110:
The display controller 60 makes access to the same to read and display the bottom field. It then exits from the current routine, thus returning to the calling process.

STEP S111:
The display controller 60 makes access to the current bank of the frame memory 53 to read and display the bottom field.

STEP S112:
The display controller 60 makes access to the same to read and display the bottom field. It then exits from the current routine, thus returning to the calling process.

Referring next to FIG. 14, the details of the second reading-order determination routine is shown. When this routine is called at step S85 in FIG. 12, the following steps are executed:

STEP S130:
The display controller 60 determines whether repeat_first_field is set to "1." If so, the process advances to step S131. If not, the process proceeds to step S138.

STEP S131:
The display controller 60 determines whether top_field_first is set to "1." If so, the process advances to step S132. If not, the process proceeds to step S135.

STEP S132:
The display controller 60 makes access to the current bank of the frame memory 53 to read and display the top field.

STEP S133:
The display controller 60 makes access to the same to read and display the bottom field.

STEP S134:
The display controller 60 makes access to the same to read and display the top field again. It then exits from the current routine, thus returning to the calling process.

STEP S135:
The display controller 60 makes access to the current bank of the frame memory 53 to read and display the bottom field.

STEP S136:
The display controller 60 makes access to the same to read and display the top field.

STEP S137:
The display controller 60 makes access to the same to read and display the bottom field again. It then exits from the current routine, thus returning to the calling process.

STEP S138:
The display controller 60 determines whether top_field_first is set to "1." If so, the process advances to step S139. If not, the process proceeds to step S141.

STEP S139:
The display controller 60 makes access to the current bank of the frame memory 53 to read and display the bottom field.

STEP S140:
The display controller 60 makes access to the same to read and display the top field. It then exits from the current routine, thus returning to the calling process.

STEP S141:
The display controller 60 makes access to the current bank of the frame memory 53 to read and display the top field.

STEP S142:
The display controller 60 makes access to the same to read and display the bottom field. It then exits from the current routine, thus returning to the calling process.

The above section, together with FIGS. 12 to 14, has described the process flow of video playback according to the present embodiment. Compared to the conventional process flow of FIGS. 9 to 11, the present embodiment is different in steps S132 to 137 in FIG. 14. These steps read and display top and bottom fields in the opposite way to their counterparts in the conventional process shown in FIG. 11. Actually, the steps S132 to 137 execute the distinct tasks corresponding to the processing rule (a) described earlier, while the other steps are common to both methods. Because of this feature, the present embodiment enables a video decoding device to perform reverse playback without producing jaggies.

The embodiment has been described, using a simple picture sequence containing only four frames I2, P3, B0, and B1. The present invention, however, should not be limited to this specific picture sequence.

The above-described processing mechanisms of the proposed video decoding device can be realized as software functions of a computer system, the instructions of which are encoded in the form of computer programs. The computer system executes such programs to provide the intended functions of the present invention. For the purpose of storage and distribution, the programs are stored in computer-readable storage media including: magnetic storage media, optical discs, magneto-optical storage media, and solid state memory devices. Magnetic storage media include hard disk drives (HDD), flexible disks (FD), and magnetic tapes. Optical discs include digital versatile discs (DVD), DVD-RAM, compact disc read-only memory (CD-ROM), CD-Recordable (CD-R), and CD-Rewritable (CD-RW). Magneto-optical storage media include magneto-optical discs (MO).

Portable storage media, such as DVD and CD-ROM, are suitable for the circulation of computer programs. Network-based distribution of software programs is also possible, in which master program files stored in a server computer are downloaded to user computers via a network. Each user computer stores necessary programs in its local storage unit, which have previously been installed from a portable storage media or downloaded from a server computer. The user computer performs intended functions by executing the programs read out of the local storage unit. As an alternative way of program execution, the user computer may execute the programs directly from the portable storage media. Another alternative method is that the user computer dynamically downloads programs from a server computer when they are demanded and executes them upon delivery.

The above discussion is summarized as follows. According to the present invention, the proposed video decoding device decodes a video stream containing MPEG-compressed frames while converting frame rates by inserting extra fields.

The device has a video data storage unit to store pictures being played back, and an attribute data storage unit to stores attribute data which describes how each picture should be displayed. Each picture is interlaced into a first and second fields. The attribute data includes a repeat-first-field flag for each picture. When playing back the video stream in a reverse direction, a reverse playback unit determines whether the repeat-first-field flag is set or cleared, and plays back the first and second fields of each picture in the same order as that in forward playback mode if the repeat-first-field flag is set. If the repeat-first-field flag is cleared, it outputs the first and second fields in the opposite order to that in the forward playback mode. The video decoding device thus enables smooth, jaggy-free reverse playback of 3:2 pulldown video streams.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A video decoding device which plays back a video stream in a reverse direction while performing telecine conversion, the video stream containing pictures each formed from top and bottom fields, the video decoding device comprising:
    a video data storage unit which stores pictures constituting the video stream that is being played back; and
    a reverse playback unit reading out the pictures from the video data storage unit,
    wherein the reverse playback unit reads out the bottom field, the top field, and the bottom field of a picture, in that order, when attributes of the picture specify that a field be repeated for telecine conversion and that the bottom field be read first in forward playback mode,
    wherein the reverse playback unit reads out the top field, the bottom field, and the top field of a picture, in that order, when attributes of the picture specify that a field be repeated for telecine conversion and that the top field be read first in forward playback mode,
    wherein the reverse playback unit reads out the top field and the bottom field of a picture, in that order, when attributes of the picture specify that no fields be repeated and that the bottom field be read first in forward playback mode, and
    wherein the reverse playback unit reads out the bottom field and the top field of a picture, in that order, when attributes of the picture specify that no fields be repeated and that the top field be read first in forward playback mode.

2. A method of playing back a video stream in a reverse direction while performing telecine conversion, the video stream containing pictures each formed from top and bottom fields, the method comprising:
    reading out the bottom field, the top field, and the bottom field of a picture, in that order, when attributes of the picture specify that a field be repeated for telecine conversion and that the bottom field be read first in forward playback mode;
    reading out the top field, the bottom field, and the top field of a picture, in that order, when attributes of the picture specify that a field be repeated for telecine conversion and that the top field be read first in forward playback mode;
    reading out the top field and the bottom field of a picture, in that order, when attributes of the picture specify that no fields be repeated and that the bottom field be read first in forward playback mode; and
    reading out the bottom field and the top field of a picture, in that order, when attributes of the picture specify that no fields be repeated and that the top field be read first in forward playback mode.

3. A computer-readable storage medium storing a program product which enables a computer to play back a video stream in a reverse direction while performing telecine conversion, the video stream containing pictures each formed from top and bottom fields, the program product causing the computer to function as:
    a video data storage unit which stores pictures constituting the video stream that is being played back; and
    a reverse playback unit, reading out the pictures from the video data storage unit,
    wherein the reverse playback unit reads out the bottom field, the top field, and the bottom field of a picture, in that order, when attributes of the picture specify that a field be repeated for telecine conversion and that the bottom field be read first in forward playback mode,
    wherein the reverse playback unit reads out the top field, the bottom field, and the top field of a picture, in that order, when attributes of the picture specify that a field be repeated for telecine conversion and that the top field be read first in forward playback mode,
    wherein the reverse playback unit reads out the top field and the bottom field of a picture, in that order, when attributes of the picture specify that no fields be repeated and that the bottom field be read first in forward playback mode, and
    wherein the reverse playback unit reads out the bottom field and the bottom field of a picture, in that order, when attributes of the picture specify that no fields be repeated and that the top field be read first in forward playback mode.

* * * * *